United States Patent [19]

Nabiullin et al.

[11] 4,119,126
[45] Oct. 10, 1978

[54] DEVICE FOR INTRODUCING FILLERS AND TERMINAL INTO GALVANIC CELL

[76] Inventors: Faat Khatovich Nabiullin, 3 Mytischinskaya ulitsa, 14a, kv. 90; Efim Mikhailovich Gertsik, Malo-Moskovskaya ulitsa, 3, kv. 92; Jury Timofeevich Rodionov, prospekt Mira, 190-A, kv. 71; Vyacheslav Anatolievich Rabinovich, prospekt Mira, 122, kv. 270, all of Moskow, U.S.S.R.

[21] Appl. No.: 679,792

[22] Filed: Apr. 23, 1976

[51] Int. Cl.² ............................................. B65B 3/32
[52] U.S. Cl. .................................. 141/100; 141/378; 222/135
[58] Field of Search ...................... 141/1, 9, 32, 67, 98, 141/99, 100, 104, 105, 152, 265, 267, 270, 275–278, 281, 285, 301, 302, 325, 369, 370, 374, 378; 222/125, 145, 281

[56] References Cited

U.S. PATENT DOCUMENTS 3,580,302  5/1971  Riesenberg .................. 141/152 X

*Primary Examiner*—Richard E. Aegerter
*Assistant Examiner*—Frederick R. Schmidt
*Attorney, Agent, or Firm*—Lackenbach, Lilling & Siegel

[57] ABSTRACT

The device for introducing fillers and a terminal into the case of a galvanic cell comprises a tool in the form of a nozzle with at least one concentric space and a central channel, a mechanism for the volumetric supply of fillers into the tool spaces incorporating cylinders which accommodate pistons with rods and have stops intended to limit the travel of the rods, the cylinder spaces communicating through holes with pressure lines feeding said fillers and with said spaces of the tool. In said device the piston of each cylinder of the mechanism for the volumetric supply of fillers has a bushing intended to vacate the space for said fillers, the distance between the holes interconnecting the space of each cylinder with the pressure line and the tool space being larger than the height of the metered portion of the filler.

The device is simple in design and characterized by a high output; it improves the quality of the finished cells, the stability of their characteristics and keeps the filler from flowing out beyond the end of the tool.

1 Claim, 12 Drawing Figures

DEVICE FOR INTRODUCING FILLERS AND TERMINAL INTO GALVANIC CELL

The present invention relates to devices used for manufacturing current sources and more specifically it relates to a device for introducing fillers and a terminal into the case of a galvanic cell.

Known in the art is a device for introducing fillers and a terminal into the case of a galvanic cell comprising a tool in the form of a nozzle provided with concentric spaces, one for each filler, and a central channel, a mechanism for the volumetric supply of fillers into the tool spaces, said mechanism comprising two cylinders, each accommodating a piston with a rod and a system of valves which put the spaces of said cylinders alternately in communication with the tool spaces and the pressure lines which feed the fillers. The device also comprises a mechanism for creating a counterpressure to resist the outflow of the fillers.

Such a device ensures efficient introduction of fillers into the case of the galvanic cell. However, it has a number of inherent disadvantages:

1. A considerable amount of time is lost in making the cell because of the need for turning the valves. Within one working cycle the valves are turned twice, first to admit the fillers from the cylinders into the tool and second to cut off the supply of fillers and to connect the cylinder spaces with the pressure lines. Elimination or a considerable reduction of these time losses allows the output of the device to be raised by at least 25-30% while retaining the same time required for the outflow of the fillers, this time depending on their physical and mechanical properties.

2. Complicated design which incorporates the operating mechanism of the valves. The process of filler discharge is controlled by two motions, those of the pistons and those of the valves, and the control of the valve turning calls for the use of a number of kinematic links such as bevel and spur gear pairs, a Geneva mechanism, etc.

Elimination of the valve turning mechanisms simplifies the design of the device substantially.

The main object of the present invention is to simplify the design of the device and to raise its output.

Another object of the invention is to improve the quality of the produced cells.

Still another object of the invention is to prevent the outflow of the filler beyond the end of the tool.

And one more object of the invention is to ensure stability of the characteristics of the produced cells.

This object is accomplished by providing a device for introducing fillers and a terminal into the case of a galvanic cell comprising a tool in the form of a nozzle with at least one concentric space and a central channel, a mechanism for the volumetric supply of fillers into the spaces of the tool, said mechanism incorporating cylinders which accommodate pistons with rods and have stops intended to limit the travel of the rods, the cylinder spaces communicating through holes with pressure lines and the tool spaces, and a mechanism for creating counterpressure to resist the outflow of the fillers according to the invention, the piston of each cylinder of the mechanism for the volumetric supply of fillers incorporates a bushing intended to vacate the space for the filler, the distance between said holes interconnecting the space of each of said cylinders with said pressure line and said space of the tool being larger than the height of the metered portion of the filler.

Such a design of the device ensures taking in a portion of the filler and transferring it into the space of the nozzle, in which case the nozzle spaces are not in communication with the pressure lines.

It is also practicable that the piston of each cylinder in the device according to the invention should be located inside the rod and should have an extension with a recess, that the piston stop should be adjustable and have a ball retainer for receiving and fixing said extension, and that the mechanism building up counterpressure which resists the outflow of the filler should be made in the form of a pusher pressed against a support by a spring-loaded block.

Such a design of the device improves the quality of the cell since it rules out the possibility of interelectrode faults. This is attributed to the fact that the beginning of outflow of the fillers, particularly of the material of the negative electrode, occurs earlier than it is provided for in the cyclogram of the device, i.e., before the piston bushing comes in contact with the stop. This occurrence is caused by friction arising between the piston bushing and the cylinder wall which sometimes leads to interelectrode faults due to pressing out of the negative electrode material at the bottom of the cell case. After the fillers have been forced out, the material of the negative electrode continues to flow out of the tool for some time.

This is attributable to the expansion of the negative electrode material compressed in the volumetric supply mechanism, the connecting holes and tool spaces by the resistance to the outflow of the fillers and by the force of counterpressure, said force of counterpressure continuing to compress the material in the tool spaces even after the end of its discharge.

The second version of the device according to the invention described above eliminates this disadvantage. On some occasions, in case of a bar-type terminal, the filler, the thickened electrolyte and the material of the negative electrode are simultaneously pressed into the mechanism for the volumetric supply while the terminal is inserted later. In this case the central channel of the tool is connected with the mechanism for the volumetric supply of the electrode filler.

This method of cell manufacture in the absence of the terminal impairs considerably the conditions for breaking off of the fillers, particularly the material of the negative electrode, i.e., pasted zinc. Besides, there is an increased amount of pasted zinc in the cell and, as a consequence, in the tool (nozzle) caused by the fact that in the case of a bar terminal there always are 5-10 single portions of the fillers between the mechanism for the volumetric supply and the end of the nozzle which results in continuing outflow of the filler after the electrode is severed and the pressure is released. Due to corrosion caused by hydrogen, pasted zinc is saturated with gas during manufacture and, particularly, during storage. When the pasted zinc is under pressure and flows out, the gas bubbles are compressed; on releasing the pressure, the bubbles grow in volume so that after the severance of the formed electrode the pasted zinc continues to flow out of the nozzle uncontrollably through approximately 10-15% of the length of the pressed-out electrode. As a result, the amount of pasted zinc in the cell varies which impairs the stability of electrical characteristics of individual cells.

To eliminate the above disadvantage the tool can be provided with an insert introduced into its central channel and made in the form of a screw with radial ribs on its end, and a cutter installed near the end of the insert, said cutter corresponding in its shape and dimensions to the insert and being secured on a bar extending through the insert. Such a design of the device is necessary for making galvanic cells with bar-type terminals for complete elimination of interelectrode faults and for reliable forming of the end of the electrode.

It is practicable that in the device according to the invention the central channel of the tool communicating with the mechanism for the volumetric supply of the electrode filler should be provided with a piston which cuts off a single portion of the electrode filler and introduces it into the cell.

All the above-proposed versions of the device for introducing fillers and a terminal into the case of the galvanic cell solve successfully the objects stated above.

Now the invention will be described in detail by way of example with reference to the accompanying drawings, in which.

Figure 1:
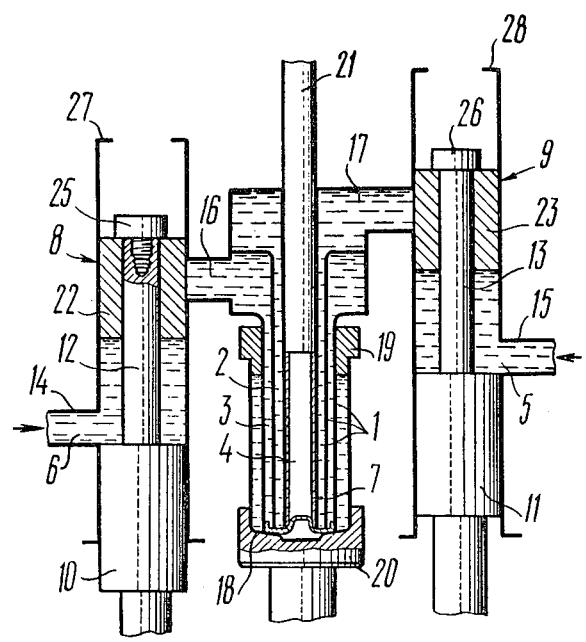
FIG. 1 is a cross sectional view of the device for introducing fillers and a terminal into the case of a galvanic cell at the moment of cylinder filling.

It can be seen in FIG. 1 that the device according to the invention consists of a tool in the form of a nozzle 1 with concentric spaces 2, 3 and a central channel 4. The concentric spaces 2, 3 are filled, for example, with a negative electrode filler 5 and thickened electrolyte 6, respectively, while a terminal 7 is inserted through the central channel 4.

The fillers 6 and 5 are fed in with the aid of a mechanism for volumetric supply consisting of cylinders 8, 9 which accommodate movable pistons 10, 11 with rods 12, 13, respectively. The spaces of the cylinders 8, 9 communicate through holes with pressure lines 14, 15 and with the spaces 3 and 2 of the nozzle 1 through a channel 16, 17 so that the distance between said holes in each cylinder is larger than the height of the metered portion of the filler. A galvanic cell case 18 with a positive electrode is slipped by a rod 20 on the nozzle 1 and a guide ring 19. The terminal 7 is inserted by a rod 21. According to the invention, each of the pistons 10, 11 of the cylinders 8, 9 is provided with a bushing 22, 23 installed movably relative to the respective rod 12, 13 and intended to vacate the space for the filler.

To prevent the material of the negative electrode from flowing out of the tool at the end of pressing out the fillers, the device incorporates a mechanism for creating counterpressure in the form of a support 24 against which the rod is pressed.

Figure 2:
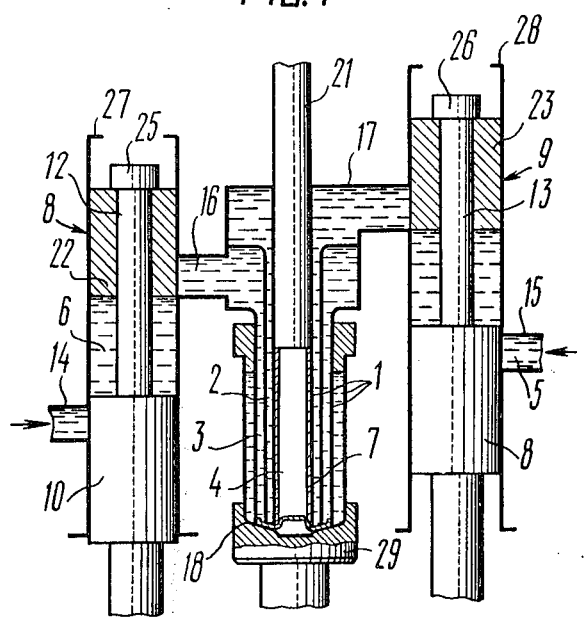
FIGS. 2, 3, 4 are cross sectional views of the same device during subsequent stages of its operation.
Figure 3:
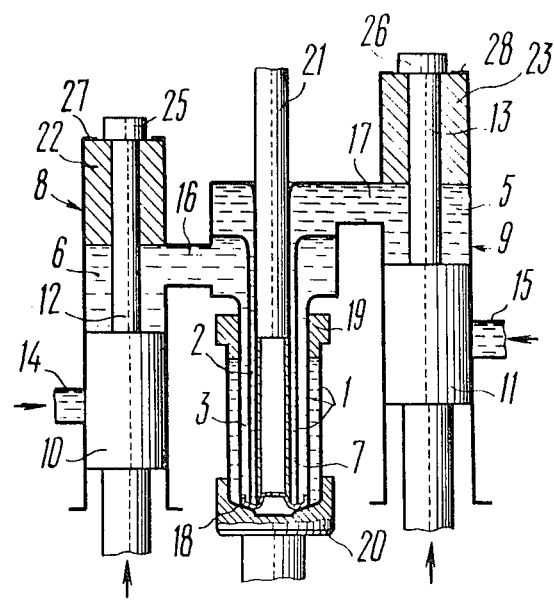
Figure 4:
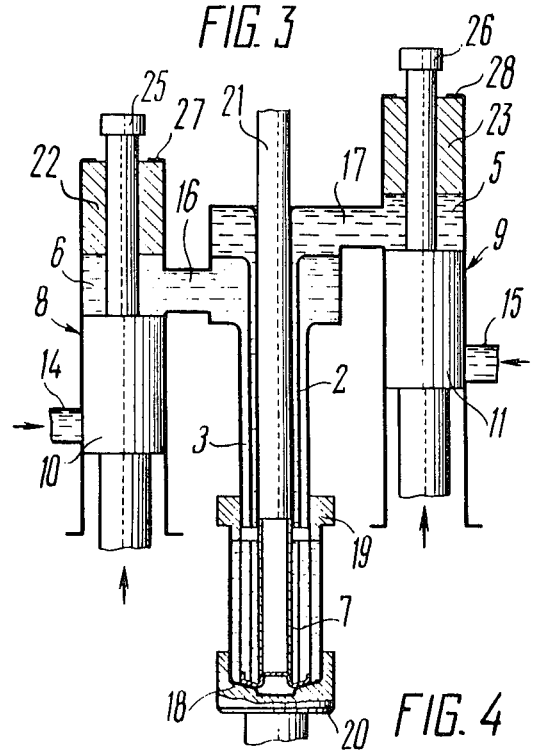

The device operates as follows. When the pistons 10, 11 are in the downmost position, the fillers 6 and 5 are fed through the corresponding pressure lines 14, 15 into the cylinders 8, 9 as shown in FIG. 1. The pressure of the fillers 5, 6 moves the bushings 22, 23 along the axes of the rods 12, 13 until they bear against retainers 25, 26. As soon as the spaces of the cylinders 8, 9 are filled, the rods 12, 13 start moving upward so that the following successive operations are performed:

(a) the pressure lines 14, 15 are cut off by the pistons 10, 11 (FIG. 2);

(b) the cylinders 8, 9 communicate through channels 16, 17 with the spaces 3, 2, respectively, of the nozzle 1 (FIG. 3), the bushings 22, 23 travel until they reach stops 27, 28 and then stay still; and (c) the fillers 5, 6 are transferred into the spaces 2, 3 of the nozzle 1 (FIG. 4).

Simultaneously with the transferring of the fillers 5, 6, the terminal 7 is moved by the rod 21. The finished cell is withdrawn from the nozzle 1, the pistons 10, 11 go to the downmost position and the process is repeated over again.

Figures 5, 6:
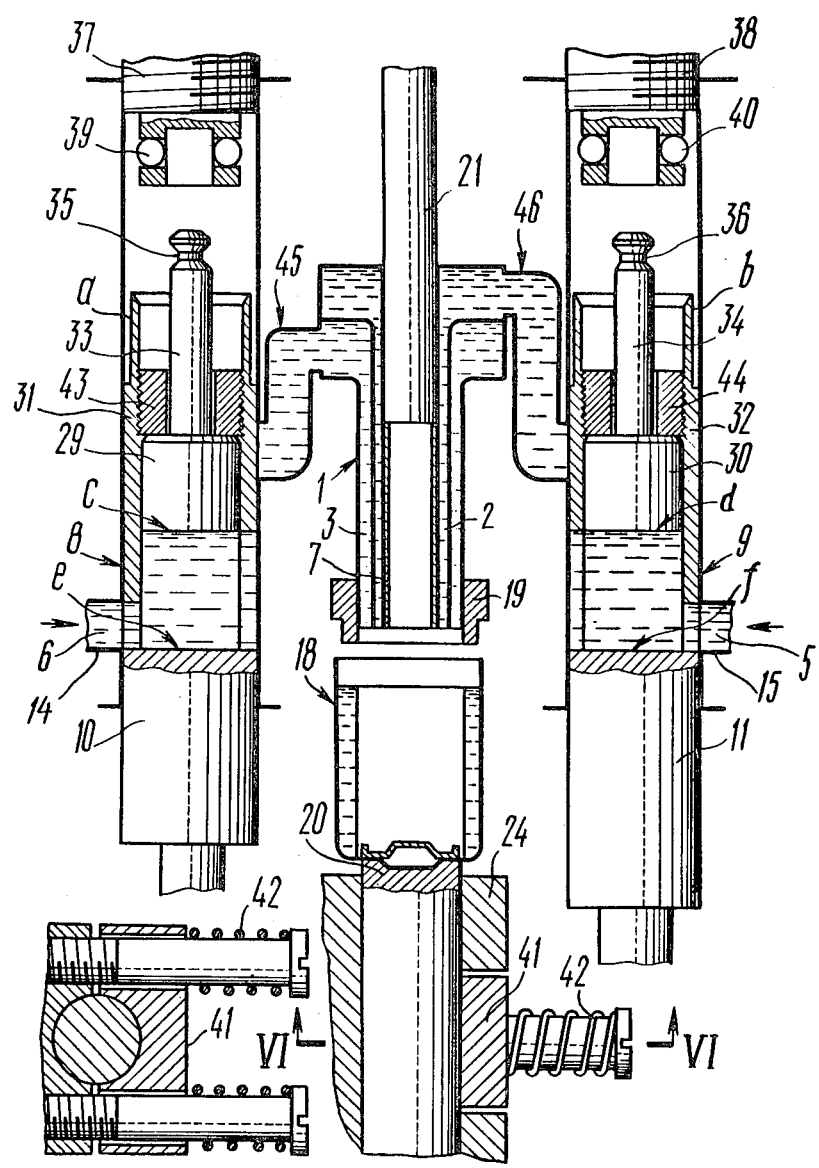
FIG. 5 is a cross sectional view of another version of the device at the moment of taking in a portion of the filler.
FIG. 6 is a cross sectional view taken along line VI—VI in FIG. 5; i.e., the mechanism for building up counterpressure.

FIGS. 5, 6 show a version of the device which differs from the device illustrated in FIGS. 1 through 4 in that the bushings 29, 30 of the cylinders 8, 9 in the mechanism for volumetric supply of the fillers are located inside the rods 31, 32 and have extensions 33, 34 provided with recesses 35, 36, respectively. Stops 37, 38 in the cylinders 8, 9 are adjustable and are provided with ball retainers 39, 40. The mechanism which creates counterpressure resisting the outflow of the filler consists of a pusher (rod 20) pressed against the support 24 by a block 41 with the aid of a spring 42.

Figure 7:
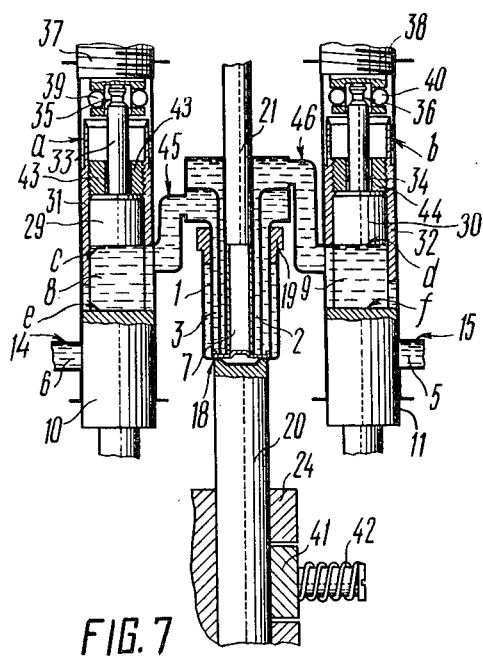
FIGS. 7, 8 are cross sectional views of subsequent stages of operation of the device illustrated in FIGS. 5, 6.
Figure 8:
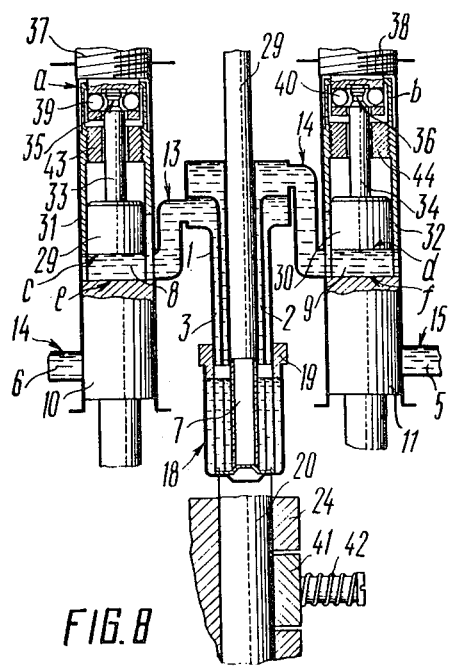

The device operates as follows. The spaces of the cylinders 8, 9 are charged with fillers 6 and 5 through the pressure lines 14, 15 with the rods 31, 32 in the downmost position. The pressure of the fillers 6 and 5 moves the bushings 29, 30 inside the rods 31, 32 until they bear against limiters 43, 44. When the cylinders 8, 9 are fully charged with the fillers, the pistons 10, 11 together with the rods 31, 32 and bushings 29, 30 start moving upward so that the following successive operations are performed:

(a) the pressure lines 14, 15 are cut off by the pistons 10, 11 (FIG. 7);

(b) the cylinders 8, 9 communicate through channels 45, 46 with the corresponding concentric spaces 3 and 2 of the tool 1 (FIG. 7); and (c) when the extensions 33, 34 of the bushings 29, 30 come in contact with the corresponding adjustable stops 37, 38, the bushings 29, 30 stop while the rods 31, 32 transfer the thickened electrolyte and the material of the negative electrode into the space of the positive electrode of the cell 18 which is slipped on the tool 1 and guide ring 19 by the pusher, i.e., the rod 20.

The rod 20 slips the case of the cell 18 on the tool 1 with the aid of a cam (not shown in the Figure) and during the outflow of the fillers 5, 6 creates counterpressure by the force of friction for which purpose it is pressed against the support 24 by the spring 42 by means of the block 41. Simultaneously with the transferring of the fillers 5, 6 the terminal 7 is moved by the rod 21. At the end of the travel of the rods 31, 32 their cylindrical portions "a" and "b" direct the ball retainers 39, 40 into the recesses 35, 36 of the extensions 33, 34 of the bushings 29, 30.

When the case of the galvanic cell 18 has been filled completely with the fillers 5, 6, the rods 31, 32 start moving downward so that the following successive operations are performed:

(a) the bushings 29, 30 are held in the uppermost position to relieve pressure, i.e., to draw part of the fillers 6 and 5 into the space formed between the ends "c" and "d" of the bushings 29, 30 and the ends "e" and "f" of the rods 31, 32 (FIG. 7); and (b) the bushings 29, 30 are released by the retainers and return together with the rods 31, 32 to the initial position and the process starts again from the beginning.

Figure 9:
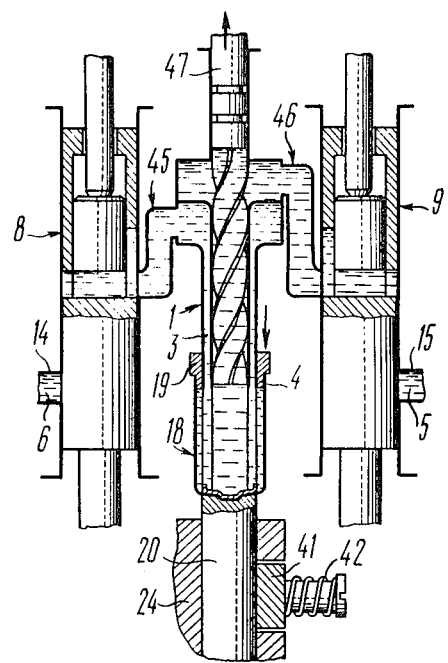
FIG. 9 is a cross sectional view of a version of the device wherein the tool is provided with a movable insert.
Figure 10:
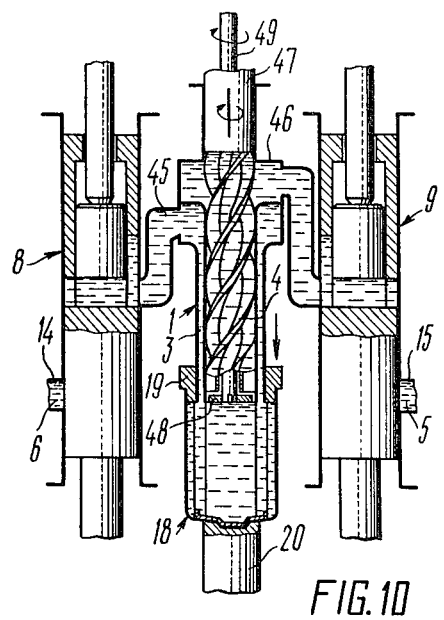
FIG. 10 is a cross sectional view of the device according to FIG. 9 wherein the tool is provided with a cutter.

FIGS. 9, 10 illustrate a version of the device which eliminates completely the possibility of interelectrode faults during the manufacture of galvanic cells with bar-type terminals and ensures correct forming of the end of the electrode. In this case the space of the positive electrode is filled simultaneously with the thickened electrolyte and the material of the negative electrode, the terminal being inserted later.

A distinctive feature of such a device is that the tool 1 is provided with an insert introduced into the central channel 4. The insert is made in the form of a screw 47 with radial ribs on its end and is made movable to prevent the outflow of the filler beyond the end face of the tool 1. In addition, the tool 1 can be provided with a cutter 48 (FIG. 10) installed at the end of the screw 47, corresponding in its shape and dimensions, to the insert, and secured on a bar 49 extending through the screw 47.

The device operates as follows. The case of the galvanic cell 18 with the positive electrode is slipped by the rod 20 on the nozzle 1 and guide ring 19. To create counterpressure resisting the outflow of the fillers 5, 6 due to the force of friction, the rod 20 is pressed against the support 24 by the spring 42 by means of the block 41. The mechanism for volumetric supply comprising cylinders 8, 9 transfers simultaneously the portions of the fillers 6 and 5 fed from the pressure lines 14, 15 through the channels 45, 46, the space 3 and the central channel 4 of the nozzle 1 into the case of the cell 18.

At the end of discharge of the fillers 5, 6 at the moment of removal of the finished cell 18, the insert in the form of the screw 47 located in the central channel 4 withdraws into said channel 4, simultaneously rotating through approximately 90° around its axis in the direction shown by an arrow in FIGS. 9, 10 so as to direct the negative electrode filler 5 into the cell.

Due to the withdrawal of the screw 47 into the central channel 4 accompanied by its rotation around its own axis the filler is drawn in which ensures reliable shaping of the electrode face surface and eliminates completely the outflow of the electrode material beyond the end of the nozzle 1 at the end of the filling process and after making good the interelectrode faults. It has been stated above that this version of the device can be provided with a cutter 48. This is practicable in the course of manufacture of large galvanic cells with a large-diameter negative electrode.

At the end of discharge of the fillers 5, 6 the cutter 48 turns around its axis and cuts off the formed electrode (the drive of the cutter turning mechanism is not shown).

Figure 11:
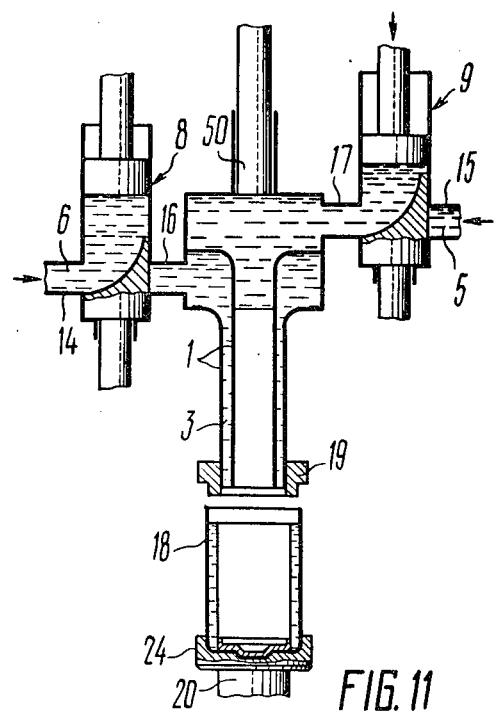
FIG. 11 is a cross sectional view of a version of the device wherein the central channel of the tool accommodates a piston.
Figure 12:
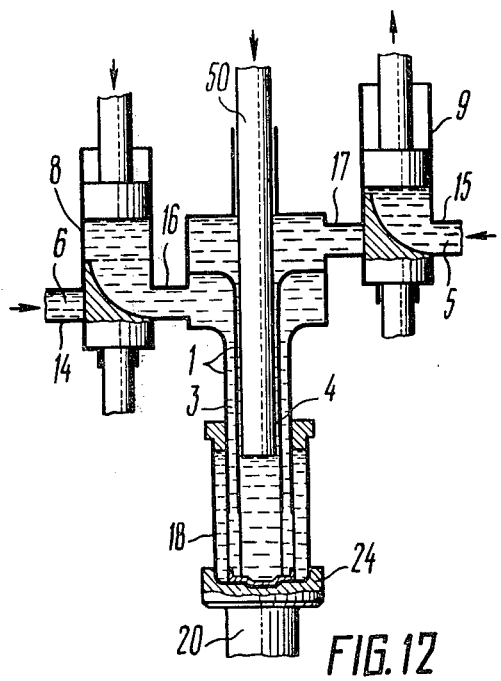
FIG. 12 is a cross sectional view of the device according to FIG. 11 in the process of introducing fillers into the cell.

FIGS. 11, 12 illustrate another version of the device according to the invention for use in similar cases, i.e., when the space of the positive electrode is simultaneously filled with the fillers, i.e., the thickened electrolyte and the material of the negative electrode, the terminal being inserted later.

In such a device the central channel 4 of the nozzle 1 is connected with the mechanism for volumetric supply of the electrode filler and is provided with a piston 50 which cuts off a portion of the electrode filler and forces it into the cell 18.

The filler 5, i.e., pasted zinc, is delivered through the central channel 4 whereas the other filler 6, i.e., thickened electrolyte, is forced through the concentric space 3 of the nozzle 1. The device operates as follows. The fillers 6 and 5 are fed through the pressure lines 14, 15 into the cylinders 8, 9 of the volumetric supply mechanism where the filler portions are cut off and transferred through the channels 16, 17 into the concentric space 3 of the nozzle 1 and its central channel 4. The piston 50 cuts off a portion of pasted zinc and forces it into the cell simultaneously with the thickened electrolyte which flows out of the concentric space 3 of the nozzle 1 in the same way as described above. In view of the fact that the central channel of the nozzle 1 contains only a single portion of pasted zinc, the weight variations of the portions do not exceed 0.1–0.2 g.

What we claim is:

1. A device for introducing fillers and a terminal into the case of a galvanic cell comprising a tool in the form of a nozzle with a central channel, said nozzle having interior partitions which define at least one interior space, each of said interior spaces being concentric with said central channel; a mechanism for volumetric supply of different fillers into said interior spaces of the nozzle incorporating cylinders, each cylinder including a piston with a rod and a stop to limit the travel of the rods, a space of each of said cylinders communicating through a first hole of said cylinder with a respective pressure line feeding a respective filler and through a second hole of said cylinder with a respective interior space of the nozzle, said piston of each of said cylinders having a bushing to vacate the space of said cylinder for said respective filler, a distance between said first and second holes of said cylinder, which place the space of each of said cylinders in communication with said respective pressure line and with said respective space of said nozzle, being larger than the height of a metered portion of a respective filler in said space said bushing of the piston in each of said cylinders being located inside of said rod and moveable relative to said rod to form said metered portion by the flow of a respective filler from said first hole into said space and having an extension with a recess, said stop for limiting the travel of said piston having a means for adjustment and having a ball retainer for receiving and holding said extension and moving said bushing relative to said rod and said piston to force said metered portion of filler from said space through said second hole into a respective interior space of said nozzle; said piston and said rod being moveable together to open and close communication of said space with said first and said second holes and a mechanism, for creating counterpressure to resist an outflow of the fillers, operatively connected to said nozzle and comprising a pusher in the form of a rod supporting the galvanic cell to be filled pressed against a support by a spring-loaded block.

* * * * *